United States Patent
Revilla et al.

(10) Patent No.: US 7,174,429 B2
(45) Date of Patent: Feb. 6, 2007

(54) METHOD FOR EXTENDING THE LOCAL MEMORY ADDRESS SPACE OF A PROCESSOR

(75) Inventors: Juan G. Revilla, Austin, TX (US); Ravi K. Kolagotla, Austin, TX (US)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 10/040,920

(22) Filed: Dec. 28, 2001

(65) Prior Publication Data

US 2003/0126367 A1 Jul. 3, 2003

(51) Int. Cl.
G06F 12/00 (2006.01)
G06F 13/00 (2006.01)

(52) U.S. Cl. .............. 711/141; 711/118; 711/154; 711/205

(58) Field of Classification Search ........ 711/100–104, 711/117, 118–119, 141, 142, 146, 154, 205, 711/207

See application file for complete search history.

(56) References Cited

U.S. PATENT DOCUMENTS

| | | | | |
|---|---|---|---|---|
| 6,078,565 A | * | 6/2000 | Ben-Michael et al. | 370/236 |
| 6,078,992 A | * | 6/2000 | Hum | 711/122 |
| 6,397,296 B1 | * | 5/2002 | Werner | 711/122 |
| 6,405,289 B1 | * | 6/2002 | Arimilli et al. | 711/145 |
| 6,470,437 B1 | * | 10/2002 | Lyon | 711/207 |
| 6,484,241 B2 | * | 11/2002 | Arimilli et al. | 711/141 |
| 6,499,076 B2 | * | 12/2002 | Date et al. | 710/113 |
| 6,523,092 B1 | * | 2/2003 | Fanning | 711/134 |
| 6,622,208 B2 | * | 9/2003 | North | 711/118 |

FOREIGN PATENT DOCUMENTS

| | | |
|---|---|---|
| EP | 1 045 307 | 10/2000 |
| JP | 2000-231549 | 8/2000 |

OTHER PUBLICATIONS

Kondo, et al., "SCIMA: Software Controlled Integrated Memory Architecture for High Performance Computing", *IEEE Comput. Soc.*, Computer Design 2000, Proceedings 2000 International Conference on Austin, TX, pp. 105-111, Sep. 17, 2000.

* cited by examiner

*Primary Examiner*—Tuan V. Thai
(74) *Attorney, Agent, or Firm*—Fish & Richardson P.C.

(57) ABSTRACT

A processor may include a local addressable memory, e.g., an SRAM, in parallel with a local cache at the highest level of the memory hierarchy, e.g., Level 1 (L1) memory. A local memory controller may handle accesses to L1 memory. The local memory controller may determine the page which includes the requested memory location and examine a page descriptor, e.g., an L1 SRAM bit, to determine if the page is in local memory. The local memory controller routes the access to the local addressable memory or the local cache depending on the state of the L1 SRAM bit.

43 Claims, 5 Drawing Sheets

METHOD FOR EXTENDING THE LOCAL MEMORY ADDRESS SPACE OF A PROCESSOR

BACKGROUND

Memory in a computer system may be arranged in a memory hierarchy including memory devices of different speeds and sizes. The type and size of a memory device and its proximity to the processor core are factors in the speed of the memory device. Generally smaller hardware is faster, and memory devices closest to the processor core are accessed fastest. Since fast memory may be expensive and space near the processor core limited, a memory hierarchy may be organized into several levels, each smaller, faster, and more expensive per byte than the next level. The goal of such a memory hierarchy is to provide a memory system with a cost almost as low as the cheapest level of memory and speed almost as fast as the fastest level of memory.

Many processors use memory caches to store copies of the most used data and instructions in order to improve access speed and overall processing speed. A memory cache, also referred to as cache store or RAM (Random Access Memory) cache, is a portion of memory which may be made of high-speed static RAM (SRAM) instead of the slower dynamic RAM (DRAM) used for main memory. Memory caches may be included at the highest level of memory and on the same integrated circuit (IC) as the processor. Such internal memory caches are also referred to as local or Level 1 (L1) caches.

The contents of the L1 cache may change depending on the task being performed by the processor. If the processor tries to access data that is not in the cache, a cache miss occurs, and the data must be retrieved from a lower level of memory. Cache misses involve a performance penalty, which includes the clock cycle in which the miss occurs and the number of cycles spent recovering the requested data from memory. Accordingly, it may be desirable to provide a local addressable memory, e.g., an L1 SRAM, to store data and instructions in the processor core to improve access speed and reduce cache miss penalties.

DETAILED DESCRIPTION

Figure 1:
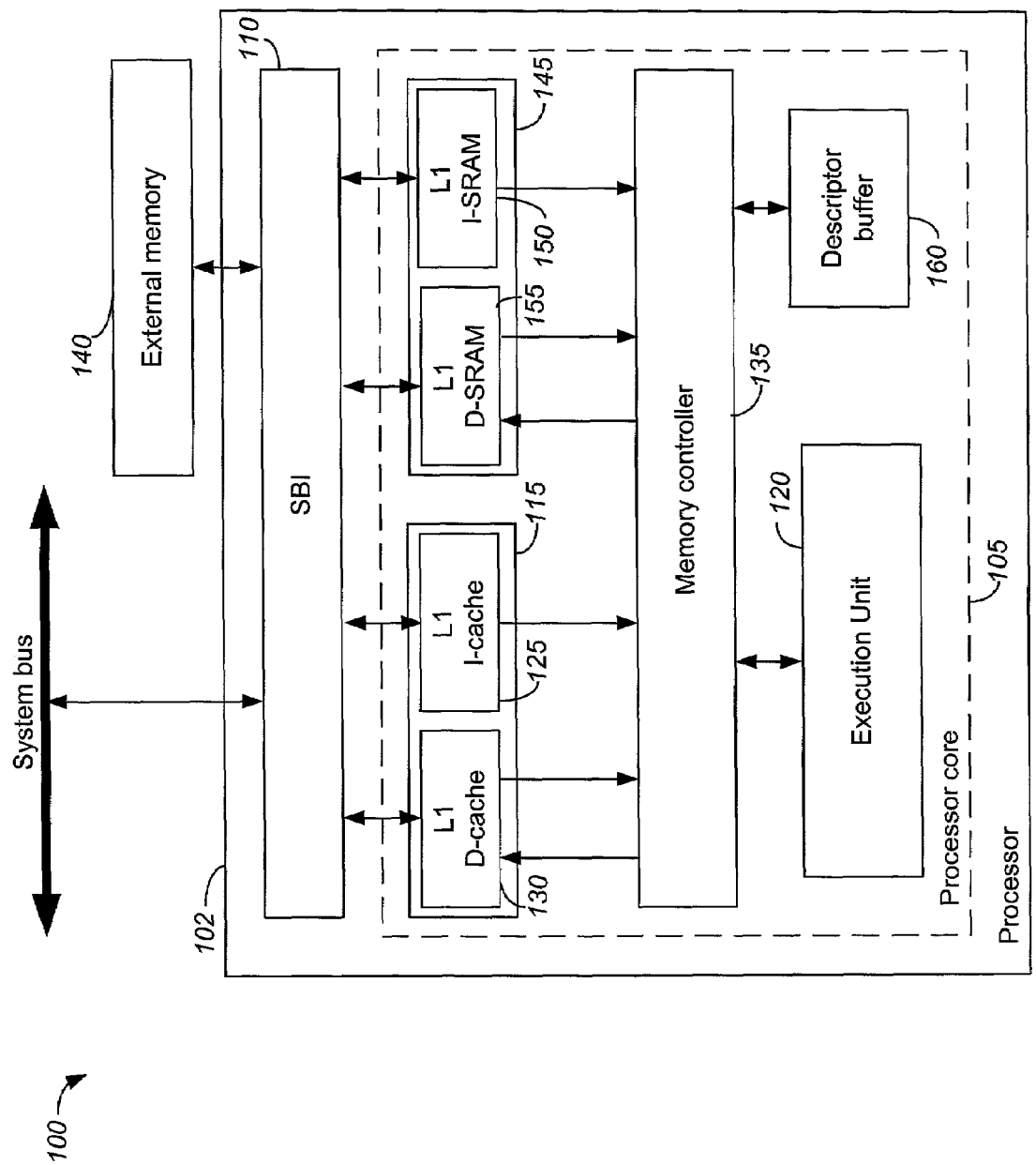
FIG. 1 is a block diagram of a processor according to an embodiment.

FIG. 1 illustrates a system 100 according to an embodiment. The system includes a processor 102 with a processor core 105 which interprets and executes software instructions. The processor core 105 may access data from an external memory 110, e.g., a Level 2 (L2) or main memory, via a system interface bus (SBI) 115.

The processor 102 may be, for example, a microcontroller or a digital signal processor (DSP), which are typically used for controller-oriented applications and numerically-intensive digital signal processing, respectively. The processor 102 may have a hybrid microcontroller/DSP architecture which is able to handle applications which have both DSP- and microcontroller-based components. Such a processor may be used in, for example, a cellular phone which has a workload with a large DSP component for performing the processing required for the base-band channel and the speech coders, as well as a control-oriented application for managing aspects of the user interface and communication protocol stacks.

The processor core 105 may include a local, or Level 1 (L1), memory level. The L1 memory level may include an L1 memory cache 115 which store copies of the most used data for fast retrieval by an execution unit 120. The contents in the L1 cache 115 may change depending on the tasks being performed by the processor 102.

The instructions and data in the L1 cache 115 may be stored separately in an L1 instruction cache (I-cache) 125 and an L1 data cache (D-cache) 130, respectively, but may share a common memory at the second and further levels of the system (L2 and lower). The separation of the instruction and data streams may enable the processor core 105 to simultaneously fetch instructions and load/store data without collisions.

The execution unit 120 may request access to memory. A memory controller 135 may check the address of the requested memory location and send the access to the L1 cache 115. If the L1 cache 115 has a copy of the requested information (cache hit), the L1 cache returns the requested information. A cache miss occurs when the processor core 105 tries to access data that is not in the L1 cache. In the event of a cache miss, the cache attempts to retrieve the requested data from the external memory 140. The retrieved data is transferred to the L1 cache from the external memory 140 via the SBI 110. A cache miss involves a penalty which includes the clock cycle in which the miss occurred and the additional clock cycles to service the miss.

The processor core 105 may include local (L1) addressable memory, e.g., an L1 SRAM (Static Random Access Memory) 145. The instructions and data in the L1 memory may be separated into an instruction SPAN (I-SRAM) 150 and a data SRAM (D-SRAM) 155, but may share a common memory at the second and further levels of the system (L2 and lower). Unlike the L1 caches, the L1 SRAMs are "real" memory and will return requested information if it exists. Thus, accesses to L1 SRAM may not entail cache misses and the associated penalties. The L1 SRAM 145 may be programmed with instructions and data used in, for example, DSP-critical applications, such as fast Fourier processing (FFP), correlation, and multiply-accumulate (MAC) operations.

Some of the system memory may be mapped in the L1 memory address space and some memory may be mapped in the L2 and lower memory address spaces. Every region in memory may be described in a page. A page is a fixed-sized block of memory and the basic unit of virtual memory. The processor 102 may support different page sizes, e.g., 1 kB, 4 kB, 1 MB, and 4 MB. Pages may have properties, e.g., cacheability and protection properties. These properties may be identified by page descriptors such as Cacheability Protection Look-aside Buffer (CPLB) descriptors and Translation Look-aside Buffer (TLB) descriptors. One such descriptor may be a local memory descriptor, e.g., an "L1 SRAM" bit, which may be defined on a page-by-page basis and identify a page as being in the L1 logical address space or not, e.g., by being set to "1" or "0", respectively.

Figure 2A:
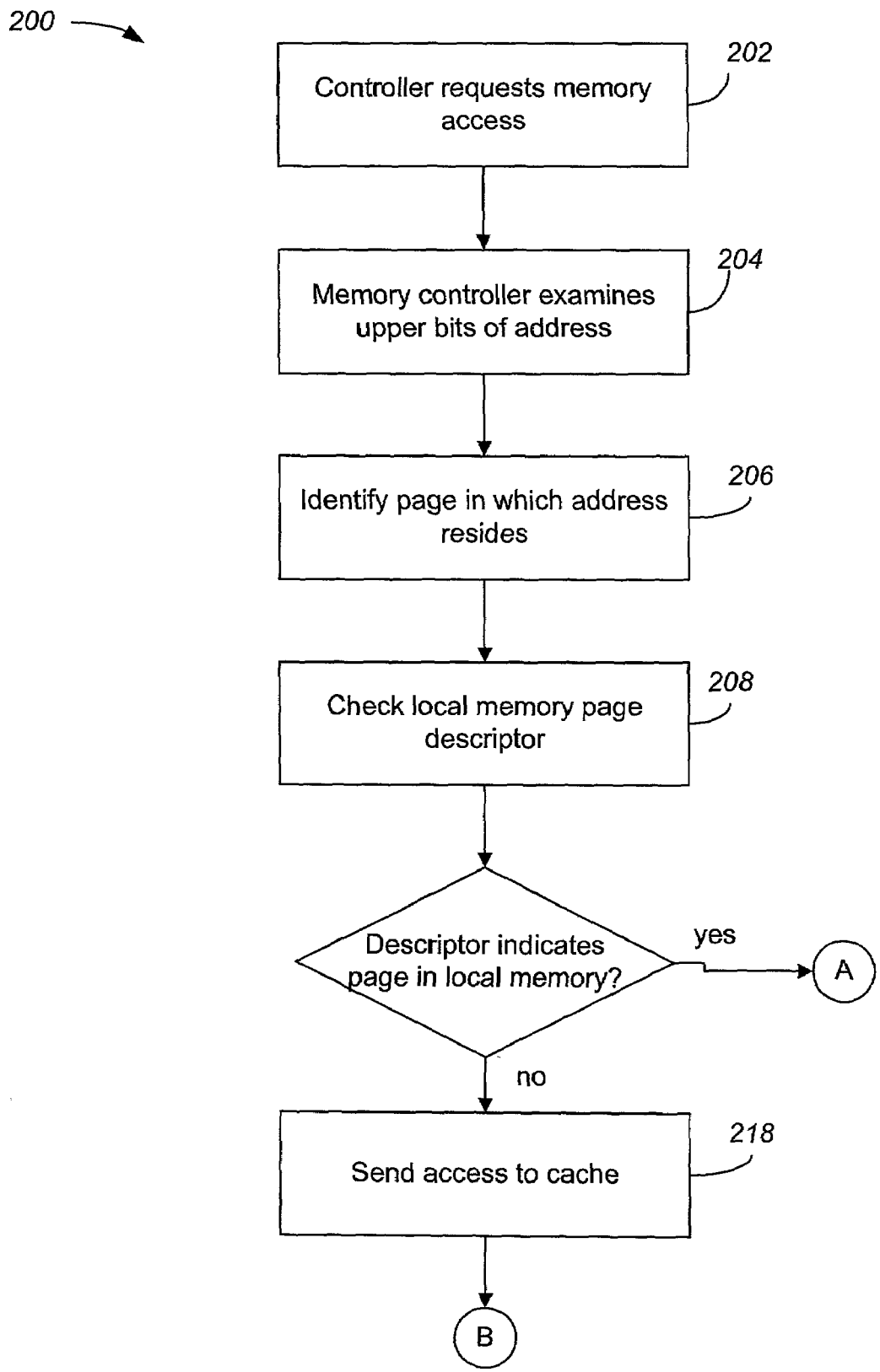
FIGS. 2A–2C illustrate a flowchart describing a memory access operation according to an embodiment.
Figure 2B:
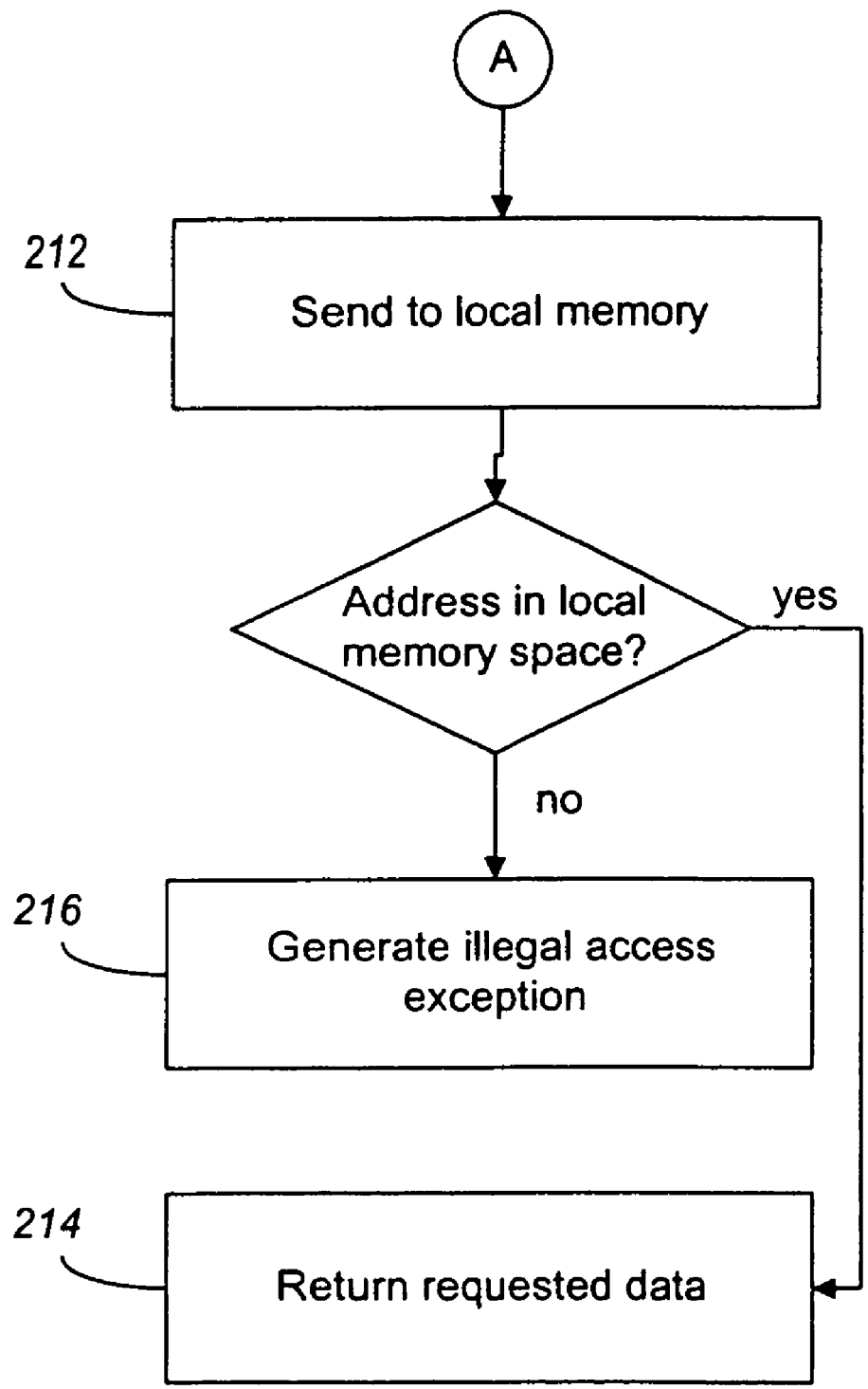
Figure 2C:
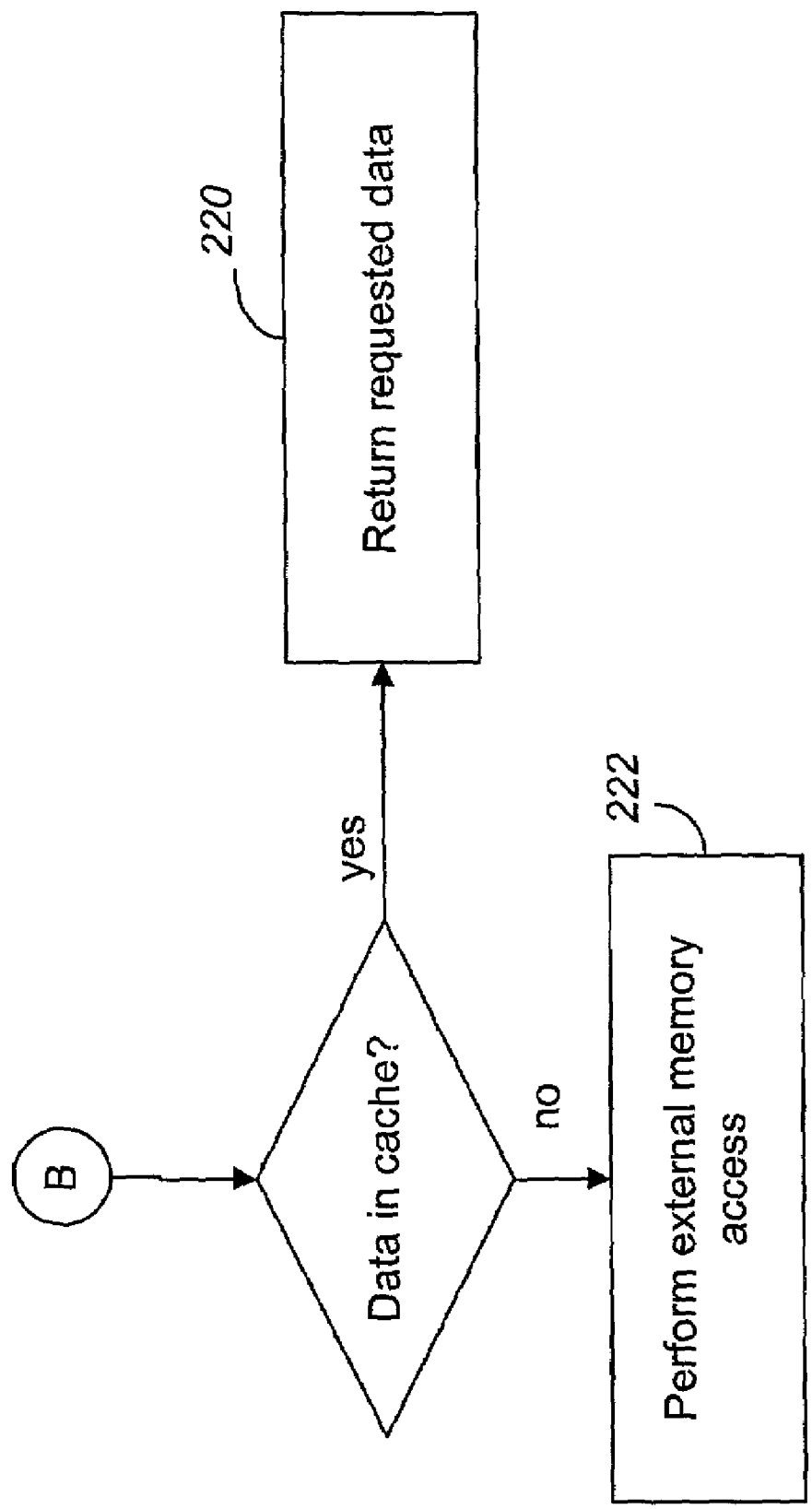

FIGS. 2A–2C illustrate a flowchart describing a memory access operation 200 according to an embodiment. The local memory controller 135 may handle memory access requests from the execution unit 120. When the execution unit requests an access to memory (block 202), the local memory controller 135 may examine the upper bits of the memory address (block 204) to determine the page in which the address resides (block 206). The local memory controller may check the L1 SRAM bit in the page descriptor to determine if the page is in the L1 memory space (block 208).

If the L1 SRAM bit is "1", indicating that the page is in the L1 address space, the local memory controller 135 sends the access to the L1 SRAM 145 (block 212). If the address exists in the L1 SRAM 145, the L1 SRAM 145 will return the requested data (block 214).

The execution unit 120 may request access to non-existent memory. This may occur due to mistakes in the program and in instances when the program wanders outside of the enabled L1 SRAM memory address space. If the access is to non-existent L1 SRAM memory, the local memory controller 135 may trigger an illegal-access violation exception (block 216). The execution flow may then be interrupted in order for the processor 102 to handle the exception.

If the L1 SRAM bit is set to "0", indicating that the address is not in the L1 address space, the local memory controller 135 may send the access to the L1 cache 115 (block 218). If a copy of the data exists in the L1 cache, the cache will return the requested data (block 220). In the event of a cache miss, the cache may perform an external memory access (block 222).

The local memory descriptor enables efficient access to local memory when local memory exists in parallel with local cache, making it unnecessary to send the access to both the L1 cache and L1 SRAM simultaneously. Since local memory requests are routed immediately to the L1 SRAM and the L1 cache does not receive such requests, the local memory controller 135 can quickly determine if an external access needs to be performed. Also, the local memory controller can prevent external memory accesses from being performed (with the associated penalties) for known non-existent memory.

The local memory descriptors and other page descriptors may be stored in a descriptor buffer. The buffer may hold a limited number of descriptor entries. Thus, using a larger page size may enable more memory to be mapped efficiently. For example, a 64 kB L1 SRAM may store sixteen 4 kB pages. Sixteen local memory descriptor entries would be needed to identify these sixteen pages. Alternatively, the entire L1 memory address space could be contained in one 1 MB page, requiring only one local memory descriptor. As long as the processor 102 accessed only the enabled portion, or separate enabled sub-portions, of the address space in the page, no illegal-accesses violation exceptions would be triggered.

The processor 102 may be implemented in a variety of systems including general purpose computing systems, digital processing systems, laptop computers, personal digital assistants (PDAs) and cellular phones. In such a system, the processor may be coupled to a memory device, such as a Flash memory device or a static random access memory (SRAM), which stores an operating system or other software applications.

Such a processor 102 may be used in video camcorders, teleconferencing, PC video cards, and High-Definition Television (HDTV). In addition, the processor 102 may be used in connection with other technologies utilizing digital signal processing such as voice processing used in mobile telephony, speech recognition, and other applications.

Figure 3:
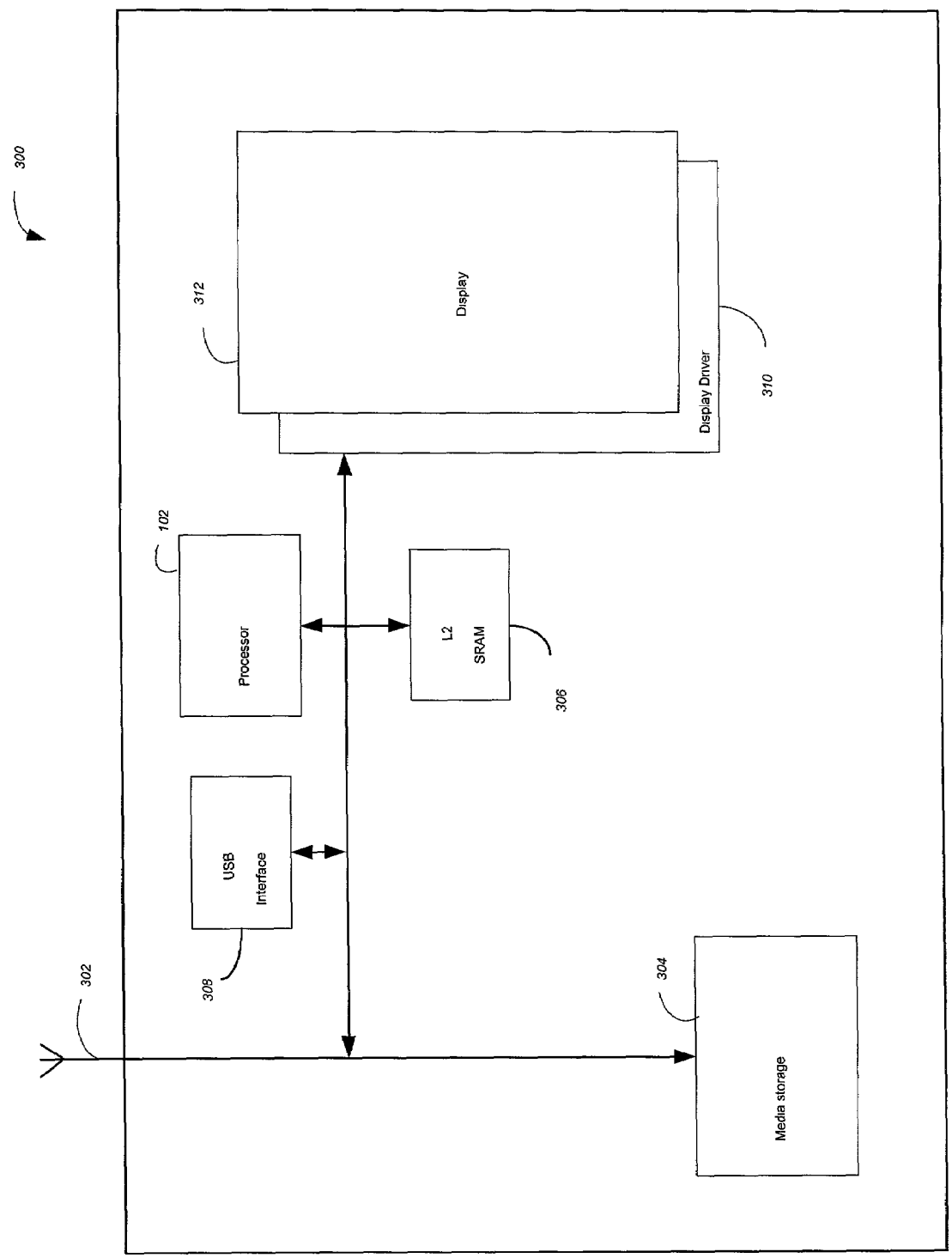
FIG. 3 is a block diagram of a system including a processor according to an embodiment.

For example, FIG. 3 illustrates a mobile video device 300 including a processor 102 according to an embodiment. The mobile video device 300 may be a hand-held device which displays video images produced from an encoded video signal received from an antenna 302 or a digital video storage medium 304, e.g., a digital video disc (DVD) or a memory card. The processor 102 may communicate with an L2 SRAM 306, which may store instructions and data for the processor operations, and other devices, for example, a USB (Universal Serial Bus) interface 308.

The processor 102 may perform various operations on the encoded video signal, including, for example, analog-to-digital conversion, demodulation, filtering, data recovery, and decoding. The processor 100 may decode the compressed digital video signal according to one of various digital video compression standards such as the MPEG-family of standards and the H.263 standard. The decoded video signal may then be input to a display driver 310 to produce the video image on a display 312.

A number of embodiments have been described. Nevertheless, it will be understood that various modifications may be made without departing from the spirit and scope of the invention. For example, blocks in the flowchart may be skipped or performed out of order and still provide desirable results. Accordingly, other embodiments are within the scope of the following claims.

The invention claimed is:

1. A method comprising:
   receiving a request for access to a memory location;
   identifying a memory block including the memory location;
   examining a local memory descriptor associated with said memory block; and
   accessing a local addressable memory in response to the local memory descriptor indicating that the memory block is in the local addressable memory, wherein:
   the local addressable memory is external to a local cache;
   the local addressable memory exists in parallel with the local cache;
   the local addressable memory is at the same level of memory as the local cache;
   a portion of a system memory is mapped to the local addressable memory;
   the local addressable memory comprises real memory;
   the local addressable memory does not comprise a cache; and
   accesses to the local addressable memory never result in a cache miss.

2. The method of claim 1, further comprising accessing the memory location in response to the memory location existing in the local addressable memory.

3. The method of claim 1, further comprising generating an illegal access violation exception in response to the memory location not existing in the local addressable memory.

4. The method of claim 1, further comprising accessing a local cache in response to the local memory descriptor indicating that the memory block is not in the local addressable memory.

5. The method of claim 1, wherein said receiving a request for access to a memory location comprises receiving an address.

6. The method of claim 5, wherein said identifying a memory block including the memory location comprises identifying a page having an address space including said address.

7. The method of claim 1, wherein accessing a local addressable memory comprises accessing a Level 1 (L1) SRAM (Static Random Access Memory).

8. The method of claim 7, wherein said examining a local memory descriptor comprises examining the state of an L1 SRAM bit associated with the memory block.

9. The method of claim 7, wherein said examining a local memory descriptor comprises examining a cacheability Protection Look-aside Buffer (CPLB) descriptor including an L1 SRAM bit associated with the memory block.

10. The method of claim 7, wherein said examining a local memory descriptor comprises examining a Translation Look-aside Buffer (TLB) descriptor including an L1 SRAM bit associated with the memory block.

11. The method of claim 7, wherein the local cache comprises an L1 cache.

12. The method of claim 1, wherein said accessing a local addressable memory never results in a cache miss.

13. The method of claim 1, wherein said local addressable memory is real memory which will not return a cache miss.

14. The method of claim 1, wherein information at said memory location is not at any other memory location in said system memory.

15. The method of claim 1, wherein said memory location is exclusively located in the local addressable memory.

16. The method of claim 1, wherein the local addressable memory has an address space, and wherein said memory location is exclusively mapped to the local addressable memory's address space.

17. The method of claim 1, wherein an access to a non-existent address in the local addressable memory results in an illegal-access exception.

18. The method of claim 1, wherein the local addressable memory is separate and different from a cache, and wherein the local addressable memory is configured to store selected bits which are directly accessed during execution without accessing a cache, the direct access of the selected bits avoiding a cache miss.

19. The method of claim 1, wherein the local addressable memory does not comprise a Translation Look-aside Buffer (TLB).

20. The method of claim 1, wherein the portion of system memory mapped to the local addressable memory is not mapped to any other memory.

21. A method comprising:
  receiving a request for access to a memory location;
  identifying a memory block including the memory location; and
  routing the request to one of a local addressable memory and a local cache in response to a state of a local memory descriptor associated with said memory block, wherein:
    the local addressable memory is external to a local cache;
    the local addressable memory exists in parallel with the local cache;
    the local addressable memory is at the same level of memory as the local cache;
    a portion of a system memory is mapped to the local addressable memory;
    the local addressable memory comprises real memory;
    the local addressable memory does not comprise a cache; and
    accesses to the local addressable memory never result in a cache miss.

22. The method of claim 21, further comprising accessing the local addressable memory.

23. The method of claim 21, further comprising generating an illegal access violation exception in response to the memory location not existing in the local addressable memory.

24. The method of claim 21, wherein accessing a local addressable memory comprises accessing a Level 1 (L1) SRAM (Static Random Access Memory).

25. The method of claim 24, wherein the local cache comprises an L1 cache.

26. An apparatus comprising:
  an execution unit;
  a local addressable memory, wherein a portion of a system memory is mapped to the local addressable memory;
  a local cache at the same level of memory as the local addressable memory; and
  a local memory controller operative to identify a memory block including a memory location in response to receiving a request for access to said memory location from the execution unit and to route the request to one of the local addressable memory and the local cache in response to the state of a local memory descriptor associated with said memory block;
  wherein:
    the local addressable memory is external to the local cache;
    the local addressable memory exists in parallel with the local cache;
    the local addressable memory comprises real memory;
    the local addressable memory does not comprise a cache; and
    accesses to the local addressable memory never result in a cache miss.

27. The apparatus of claim 26, further comprising a plurality of local memory descriptors associated with a plurality of memory blocks.

28. The apparatus of claim 26, wherein the local addressable memory comprises a Level 1 (L1) SRAM (Static Random Access Memory).

29. The apparatus of claim 28, wherein the local memory descriptor comprises an L1 SRAM bit indicating whether an associated memory block resides in the local memory.

30. The apparatus of claim 28, wherein the local cache comprises an L1 cache.

31. A system comprising:
  a processor including
    an execution unit,
    a local addressable memory, wherein a portion of a system memory is mapped to the local addressable memory,
    a local cache at the same level of memory as the local addressable memory, and
    a local memory controller operative to identify a memory block including a memory location in response to receiving a request for access to said memory location from the execution unit and to route the request to one of the local addressable memory arid the local cache in response to the state of a local memory descriptor associated with said memory block;
  a USB (Universal Serial Bus) interface; and
  a system bus coupled to the processor and the USB interface;
  wherein:
    the local addressable memory is external to the local cache;
    the local addressable memory exists in parallel with the local cache;

the local addressable memory comprises real memory;
the local addressable memory does not comprise a cache; and
accesses to the local addressable memory never result in a cache miss.

32. The system of claim 31, wherein the local addressable memory comprises a Level 1 (L1 SRAM (Static Random Access Memory).

33. The system of claim 32, wherein the local cache comprises an L1 cache.

34. An article comprising a machine-readable medium including machine-executable instruction, the instructions operative to cause a machine to:
receive a request for access to a memory location;
identify a memory block including the memory location;
examine a local memory descriptor associated with said memory block; and
access a local addressable memory in response to the local memory descriptor indicating that the memory block is in the local addressable memory, wherein:
the local addressable memory is external to a local cache;
the local addressable memory exists in parallel with the local cache;
the local addressable memory is at the same level of memory as the local cache;
a portion of a system memory is mapped to the local addressable memory;
the local addressable memory comprises real memory;
the local addressable memory does not comprise a cache;
accesses to the local addressable memory never result in a cache miss.

35. The article of claim 34, further comprising instructions operative to cause the machine to access the memory location in response to the memory location existing in the local addressable memory.

36. The article of claim 34, further comprising instructions operative to cause the machine to generate an illegal access violation exception in response to the memory location not existing in the local addressable memory.

37. The article of claim 34, further comprising instructions operative to cause the machine to access a local cache in response to the local memory descriptor indicating that the memory block is not in the local addressable memory.

38. An article comprising a machine-readable medium including machine-executable instructions, the instructions operative to cause a machine to:
receive a request for access to a memory location;
identity a memory block including the memory location; and
route the request to one of a local addressable memory and a local cache in response to the state of a local memory descriptor associated with said memory block, wherein:
the local addressable memory is external to a local cache;
the local addressable memory exists in parallel with the local cache;
the local addressable memory is at the same level of memory as the local cache;
a portion of a system memory is mapped to the local addressable memory;
the local addressable memory comprises real memory;
the local addressable memory does not comprise a cache; and
accesses to the local addressable memory never result an a cache miss.

39. The article of claim 38, further comprising instructions operative to cause the machine to:
access the local addressable memory; and
generate an illegal access violation exception in response to the memory location not existing in the local addressable memory.

40. The method of claim 38, wherein the instructions operative to cause the machine to access a local addressable memory include instructions operative to cause the machine to access a Level 1 (L1) SRAM (Static Random Access Memory).

41. The method of claim 40, wherein the local cache comprises an L1 cache.

42. A method comprising:
receiving a request for access to a memory location;
identifying a memory block including the memory location;
examining a local memory descriptor associated with said memory block;
accessing a local addressable memory in response to the local memory descriptor indicating that the memory block is in the local addressable memory; and
accessing a local cache in response to the local memory descriptor indicating that the memory block is not in the local addressable memory, wherein:
the local addressable memory is external to the local cache;
the local addressable memory exists in parallel with the local cache;
the local addressable memory is at the same level of memory as the local cache;
a portion of a system memory is mapped to the local addressable memory;
the local addressable memory comprises real memory;
the local addressable memory does not comprise a cache; and
accesses to the local addressable memory never result in a cache miss.

43. The method of claim 42, wherein the same level of memory is Level 1 (L1) memory.

* * * * *